A. N. NEWTON.
Inclined Seed-Dropper.

No. 212,731. Patented Feb. 25, 1879.

Witnesses:

Inventor:
Abner N. Newton
By F. B. Hunt & Co.
Attys

UNITED STATES PATENT OFFICE.

ABNER N. NEWTON, OF RICHMOND, INDIANA.

IMPROVEMENT IN INCLINED SEED-DROPPERS.

Specification forming part of Letters Patent No. 212,731, dated February 25, 1879; application filed July 31, 1878.

*To all whom it may concern:*

Be it known that I, ABNER N. NEWTON, of Richmond, county of Wayne, and State of Indiana, have invented a new and useful Improvement in Inclined Seed-Droppers, of which the following is a specification:

This invention relates to a novel arrangement of an inclined cylindrical seed-hopper having an inclined revolving seed-dropper arranged in its base, as hereinafter fully described.

Figure 1:
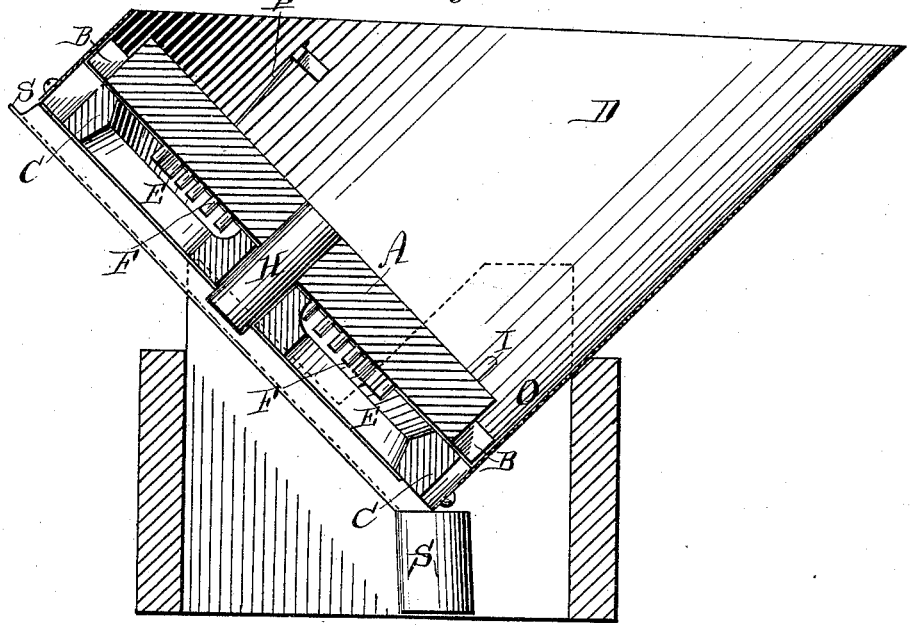
Figure 2:
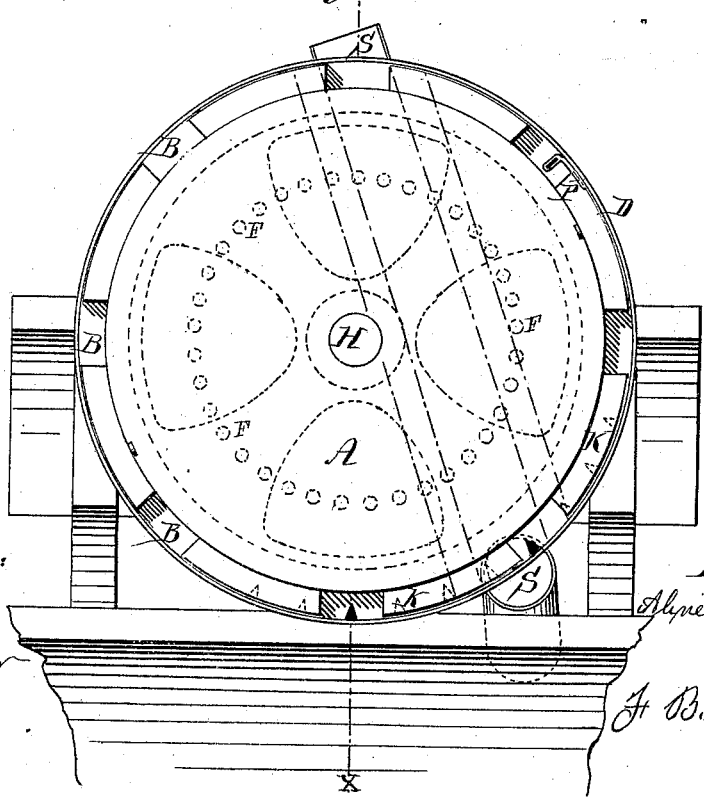

Figure 1 is a vertical section through the dropper and seed-hopper on the line $xx$ of Fig. 2. Fig. 2 is a rear view of the cylindrical seed-hopper and revolving dropper, the base-plate being removed.

A is the dropper, having seed-cells B in its periphery to receive the grains upon edge as they slide down the inclined bottom C of the seed-hopper. The dropper revolves upon the axis H in either direction, discharging the seed at its apex. The dropper also has agitators I attached to it, and revolving with it, to effectually stir the grain or seed, thereby causing the cells to fill with great certainty. Teeth F are attached to the back of the dropper, by means of which it is rotated by a pinion driven from the ground-wheel of the machine in the ordinary way.

S is the seed-spout, and the dropper revolves in either direction and carries the seed to the upper end of the seed-spout at its apex. A fender, P, serves to wipe off surplus grains that may adhere to the cells.

Chaff-openings K are made in the base-plate C. The dropper lies and revolves upon this base-plate. The seed-hopper D is cylindrical, and its top is cut oblique to the cylinder; and the top being horizontal and the cylinder at right angles to the dropper and base-plate, they are of necessity inclined.

With this construction of machine, beans, cotton, or any other kind of seeds may be planted by simply replacing the dropper with a dropper having the required cells for the work to be performed.

Having thus fully described my invention, what I claim, and desire to secure by Letters Patent, is—

1. The seed-dropper A, arranged to revolve in a plane oblique to the horizon and to discharge the seed at the apex of its periphery, substantially as set forth.

2. In combination with an inclined seed-dropper arranged to revolve in either direction, one or more agitators, I, substantially as set forth.

3. In combination with an inclined cylindrical seed-hopper, the base C, having chaff-openings K at or near the bottom, substantially as set forth.

4. In combination with the inclined cylindrical seed-hopper and base C, the inclined seed-dropper provided with agitators I, substantially as set forth.

5. In combination with the inclined cylindrical seed-hopper D, dropper A, and base C, the agitators I and fender P, substantially as set forth.

6. In combination with the inclined cylindrical hopper and inclined seed-dropper, the seed-spout S, extending up to receive the seed at the apex of the dropper, substantially as set forth.

ABNER N. NEWTON.

Witnesses:
WM. N. MATTHEWS,
S. B. HINDMAN.